(12) United States Patent
Gupta et al.

(10) Patent No.: US 9,077,958 B2
(45) Date of Patent: Jul. 7, 2015

(54) ROAD DEPARTURE WARNING SYSTEM

(75) Inventors: Rakesh Gupta, Mountain View, CA (US); Ananth Ranganathan, Mountain View, CA (US); Jongwoo Lim, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 318 days.

(21) Appl. No.: 13/221,132

(22) Filed: Aug. 30, 2011

(65) Prior Publication Data
US 2012/0050489 A1 Mar. 1, 2012

Related U.S. Application Data

(60) Provisional application No. 61/378,298, filed on Aug. 30, 2010.

(51) Int. Cl.
*H04N 13/00* (2006.01)

(52) U.S. Cl.
CPC ..................... *H04N 13/00* (2013.01)

(58) Field of Classification Search
None
See application file for complete search history.

(56) References Cited

U.S. PATENT DOCUMENTS

| | | | |
|---|---|---|---|
| 5,410,346 A * | 4/1995 | Saneyoshi et al. | 348/116 |
| 5,675,489 A * | 10/1997 | Pomerleau | 701/28 |
| 5,922,036 A | 7/1999 | Yasui et al. | |
| 5,983,161 A | 11/1999 | Lemelson et al. | |
| 6,330,363 B1 * | 12/2001 | Accad | 382/232 |
| 6,385,536 B2 | 5/2002 | Kimura | |
| 6,748,302 B2 | 6/2004 | Kawazoe | |
| 7,038,694 B1 * | 5/2006 | Santodomingo et al. | 345/582 |
| 7,610,146 B2 | 10/2009 | Breed | |
| 7,747,039 B2 | 6/2010 | Fujimoto | |
| 7,899,621 B2 | 3/2011 | Breed et al. | |
| 8,204,316 B2 * | 6/2012 | Panahpour Tehrani et al. | 382/224 |
| 8,339,454 B1 * | 12/2012 | Maali | 348/149 |
| 8,462,988 B2 * | 6/2013 | Boon | 382/104 |
| 2005/0033505 A1 * | 2/2005 | Zatz | 701/117 |
| 2005/0149259 A1 * | 7/2005 | Cherveny et al. | 701/208 |
| 2007/0014488 A1 | 1/2007 | Chen et al. | |
| 2007/0164852 A1 | 7/2007 | Litkouhi | |

(Continued)

OTHER PUBLICATIONS

Zhang et al., "Texture-based segmentation of road images" Intelligent Vehicles' 94 Symposium, Proceedings of the. IEEE, 1994, pp. 260-265.*

(Continued)

*Primary Examiner* — Dave Czekaj
*Assistant Examiner* — Mohammad J Rahman
(74) *Attorney, Agent, or Firm* — Fenwick & West LLP; Mark E. Duell (57) ABSTRACT

The prevention of vehicle accidents is targeted. A road texture model is created based on a vehicle camera image. An initial vehicle location estimate is determined, and map imagery is obtained based on this location estimate. A refined vehicle location is determined using visual egomotion. In particular, 3D features of the vehicle image and the retrieved map imagery are identified and aligned. A map image is selected based on this alignment, and the location associated with the map image is modified by a displacement between the selected map image and the vehicle image to produce a refined vehicle location. A road boundary model is created based on the road texture model and the refined vehicle location, and a road departure model is created based on the road boundary model and vehicle odometry information. The operator of the vehicle is warned of a road departure based on the road departure model.

19 Claims, 7 Drawing Sheets

(56) References Cited

U.S. PATENT DOCUMENTS

| | | | |
|---|---|---|---|
| 2008/0015775 A1 | 1/2008 | Guo et al. | |
| 2008/0129541 A1* | 6/2008 | Lu et al. | 340/905 |
| 2008/0239076 A1* | 10/2008 | Luo | 348/148 |
| 2009/0208106 A1* | 8/2009 | Dunlop et al. | 382/173 |
| 2010/0052969 A1* | 3/2010 | Niktash | 342/22 |
| 2010/0054538 A1* | 3/2010 | Boon | 382/104 |
| 2010/0079590 A1* | 4/2010 | Kuehnle et al. | 348/118 |
| 2010/0086211 A1* | 4/2010 | Kuehnle et al. | 382/195 |
| 2010/0121577 A1* | 5/2010 | Zhang et al. | 701/301 |
| 2010/0246901 A1* | 9/2010 | Yang | 382/107 |
| 2010/0262317 A1* | 10/2010 | Suzuki et al. | 701/1 |
| 2011/0282578 A1* | 11/2011 | Miksa et al. | 701/208 |
| 2012/0026293 A1* | 2/2012 | Gruetzmann et al. | 348/46 |
| 2014/0111647 A1* | 4/2014 | Atsmon et al. | 348/148 |

OTHER PUBLICATIONS

Leung et al., "Representing and Recognizing the Visual Appearance of Materials using Three-dimensional Textons", International Journal of Computer Vision 43 (1), 29-44, 2001.*

Riseman et al. "Extracting road networks from natural terrain for visualization." Fifth Inter. Conf. on Computer Graphics and Visualization, 1997.*

Liu et al. "Urban Road Tracking by Fusion of SVDD and Region Adjacency Graphs from VHR imagery", pp. 139-144, Jul. 5-7, 2010.*

Alon, Y. et al., "Off-road Path Following Using Region Classification and Geometric Projection Constraints," *IEEE Computer Society Conference on Computer Vision and Pattern Recognition*, 2006, pp. 689-696, vol. 1.

Breiman, L. "Random Forests," *Machine Learning*, Oct. 2001, pp. 5-32, vol. 45, No. 1.

Dickmanns, E.D. et al., "Recursive 3-D Road and Relative Ego-state Recognition," *IEEE Transaction on Pattern Analysis and Machine Intelligence*, Feb. 1992, pp. 199-213, vol. 14, No. 2.

Geurts, P. et al., "Extremely Randomized Trees," *Machine Learning*, Apr. 2006, pp. 3-42, vol. 63, No. 1.

Hsu, P. et al., "The Adaptive Lane-departure Warning System," *Proceedings of the 41st SICE Annual Conference*, Aug. 5-7, 2002, pp. 2867-2872, vol. 5, Osaka, Japan.

Kang, D.J. et al., "Road Lane Segmentation Using Dynamic Programming for Active Safety Vehicles," *Pattern Recognition Letters*, 2003, pp. 3177-3185, vol. 24, No. 16.

Leib, D. et al., "Adaptive Road Following Using Self-Supervised Learning and Reverse Optical Flow," *Robotics: Science and Systems (RSS)*, 2005, pp. 36-43.

Malik, J. et al., "Contour and Texture Analysis for Image Segmentation," *International Journal of Computer Vision*, Jun. 2001, pp. 7-27, vol. 43.

Mammar, S. et al., "Time to Line Crossing for Lane Departure Avoidance: A Theoretical Study and Experimental Setting," *IEEE Transactions on Intelligent Transportation Systems*, 2006, pp. 226-241, vol. 7, No. 2.

Matsushita, Y. et al., "Simultaneous Estimation of Road Region and Ego-Motion with Multiple Road Models," *Multisenseor Fusion and Integration for Intelligent Systems*, 2009, pp. 271-288, Part 2.

McCall, J.C. et al., "Video-based Lane Estimation and Tracking for Driver Assistance: Survey, System, and Evaluation," *IEEE Transactions on Intelligent Transportations Systems*, Mar. 2006, pp. 20-37, vol. 7, No. 1.

Nedevschi, S. et al., "3D Lane Detection System Based on Stereovision," *Proceedings of the IEEE Intelligent Transportation Systems Conference*, 2004, pp. 161-166.

Rae, A. et al., "Fusion of GPS and Machine Vision for Absolute Vehicle Positioning," *American Society for Photogrammetry and Remote Sensing 2007 Annual Conference*, May 7-11, 2007, six pages, Tampa, Florida, USA.

Rakauskas, M.E. et al., "Evaluation of a DGPS Driver Assistive System for Snowplows and Emergency Vehicles," *International Conference of Traffic and Transport Psychology*, 2004, pp. 257-272.

Redmill, K. et al., "A Lane Tracking System for Intelligent Vehicle Applications," *IEEE Intelligent Transportation Systems Conference*, Aug. 25-29, 2001, pp. 273-279, Oakland, California, USA.

Rogers, S. et al., "Mining GPS Data to Augment Road Models," *International Conference on Knowledge Discovery and Data Mining*, 1999, pp. 104-113.

* cited by examiner

ROAD DEPARTURE WARNING SYSTEM

RELATED APPLICATIONS

This application claims the benefit of U.S. Provisional Application No. 61/378,298, filed Aug. 30, 2010 the content of which is incorporated by reference herein in its entirety.

FIELD OF THE INVENTION

The exemplary embodiments relate to the field of vehicle human-machine interfaces and more particularly to a warning system for warning the operator of a vehicle of potential road departures.

BACKGROUND OF THE INVENTION

Vehicle safety consistently remains a cause for concern amongst vehicle manufacturers and consumers. Road departures comprise a major cause of vehicle injuries and fatalities each year. In order to address this issue, manufactures have included active stability control systems and related approaches in vehicles to prevent vehicles from driving outside the boundaries of the road. Although these approaches contain numerous advances designed to increase vehicle safety, the operator's actions are often the ultimate arbiter of whether a vehicle accident results in injury to the vehicle's occupants and others, and thus providing a timely warning to the operator of a potential road departure is crucial.

Vehicle warning systems anticipate potential impending or imminent accidents and provide warnings to vehicle operators so that the operators can take an action to avoid the accident. Previous road and lane departure systems rely on the use of road and lane markings, which are not always visible (for instance, during poor-visibility weather conditions) or present (for instance, on sidewalks, dirt roads, private roads, rural roads, and other paths). In addition, many previous road and lane departure systems only work for vehicles travelling above a certain speed. This precludes the use of these systems in non-automobile vehicles and on low-speed roads, sidewalks, paths or other roads in which high speeds are dangerous or aren't possible.

Additional road and lane departure systems rely on multiple-meter Global Positioning System (GPS) signals, which are only accurate to within several meters, which limits the ability of these systems to provide road departure warnings early enough to be useful to the operator of a vehicle. Further, relying on multiple-meter accuracy for departure warnings results in false-positive warnings, which are annoying to drivers. Such false-positive warnings may cause the operator of a vehicle to disable the warnings, thereby nullifying the effectiveness of the warnings, or may cause a consumer to avoid purchasing a vehicle equipped to provide such warnings entirely.

SUMMARY OF THE INVENTION

The prevention of vehicle accidents as a result of avoidable road departures is described. A road texture model is created based on an image received from a vehicle camera. An initial vehicle location estimate is determined, and map imagery is retrieved based on this location estimate. A refined vehicle location is determined using visual egomotion. The road texture model and the refined vehicle location are used to create a road boundary model, which includes but is not limited to a description of the edges of the road on which the vehicle is located. A road departure model is created based on the road boundary model and vehicle odometry information. A warning is issued to the operator of the vehicle based on the road departure model. For example, if the road departure model indicates a likelihood or high probability of a road departure, an audio or visual warning may be presented to the vehicle operator.

Creating a road texture model may include processing the vehicle camera image using a filter bank. The filter bank produces a texton for each pixel in the vehicle image. The textons are classified using a set of classifiers, and the classified textons are smoothed based on the classification of nearby textons. In one embodiment, the set of classifiers is trained on a set of training images with pre-classified pixels. The classifiers may be random forest classifiers, and the classifiers may be updated during runtime based on the classification of pixels with known classifications.

The retrieved map imagery may include satellite map images, aerial map images, and street view map images. The initial vehicle location estimate may be received from a GPS receiver, or may be determined from a previous location estimate or determination in combination with odometry information describing the movement of the vehicle. Determining a refined vehicle location using visual egomotion may include identifying and aligning 3D features in the vehicle camera image and retrieved map images to select a map image which best aligns with the vehicle camera image. Identifying 3D features in an image may involve using edge detectors to detect edges in images. Aligning 3D features may include projecting the 3D features of images onto the ground plane and comparing the ground plane location of the vehicle image's 3D features to the ground plane location of each map image's 3D features.

Selecting a map image based on the 3D feature alignment may involve selecting the map image with the most 3D features in common with the vehicle camera image. The location associated with the selected map image may be determined. A displacement between the location associated with the selected map image and the location associated with the vehicle camera image is determined. The displacement is applied to the location associated with the selected map image to determined a refined vehicle location.

The road boundary model may be created by identifying the edges of the road based on an image of the road. In the event that the edges of the road are marked (for instance, with solid lane lines), the marked edges are used as the identified edges. If the edges of the road aren't marked, classifiers may be applied to the image of the road to identify the road edges. The width of the road may be identified based on the identified road edges, and may be optionally reduced by a safety margin. The center line and shape of the road may also be identified. Curves may be fitted to the road edges, and optionally to the road center line and shape, to create a road boundary model.

The road departure model may be created by identifying the probability of a road departure based on the road boundary model and the vehicle odometry information. In this embodiment, a vehicle operator may be warned if the road departure model indicates a probability of road departure which exceeds a pre-determined probability threshold.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Road Departure Warning System Overview

Figure 1:
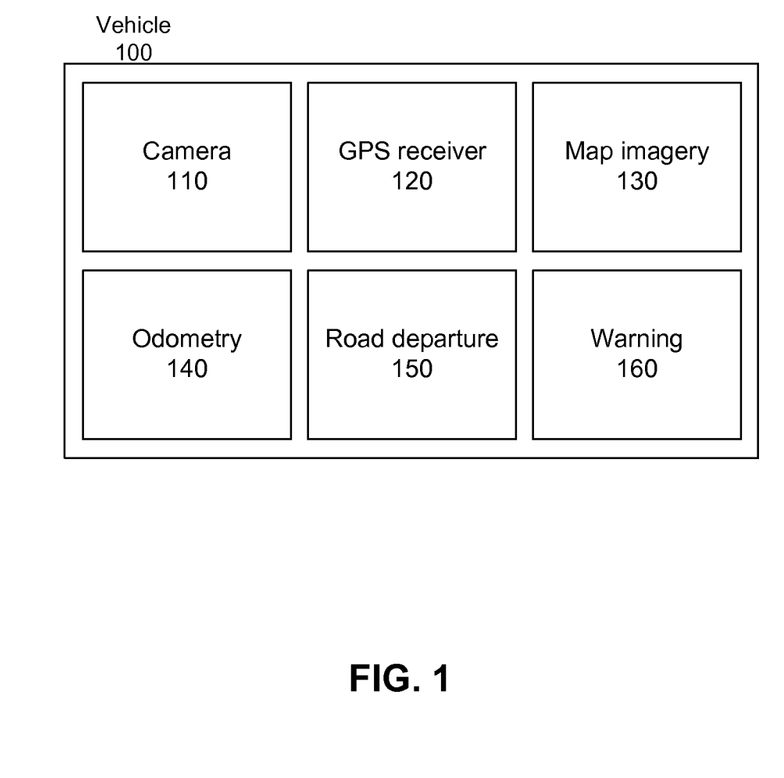
FIG. 1 illustrates a vehicle environment for a road departure warning system in accordance with one embodiment.

FIG. 1 illustrates a vehicle environment for a road departure warning system in accordance with one embodiment. The road departure warning system described herein is implemented in a vehicle 100. The vehicle 100 may be a passenger automobile, a utility vehicle, a semi-truck, a motorcycle, a tractor, a bus or van, an ambulance or fire truck, or any vehicle traditionally driven on roadways. Alternatively, the vehicle 100 may be a personal mobility vehicle, such as a scooter, an electric wheelchair, a drivable cart, or any other low-speed vehicle. In addition, the vehicle 100 may be an off-road vehicle, a snowmobile, or any other type of vehicle capable of driving roads, paths, trails, sidewalks, parking lots, or any other type of route capable of being navigated (collectively referred to herein as "roads").

The vehicle 100 includes a camera 100, a GPS receiver 120, a map imagery module 130, an odometry module 140, a road departure module 150, and a warning module 160. In alternative embodiments, additional or fewer components may be present, or the functionality of two or more of these components may be combined. The camera 110 is configured to capture images of the road in the direction in which the vehicle 100 is traveling. This configuration typically involves the camera 110 capturing images of the road directly in front of the vehicle 100 as the vehicle 100 moves forward. However, the camera 110 may be additionally configured to capture images of the road to the sides of the vehicle 100, or may be configured to capture images of the road behind the vehicle 100 when the vehicle 100 is being driven in reverse. The camera 110 may include more than one camera, with each camera configured to capture images in a different direction, of a different depth, in various resolutions, and so forth. The camera 110 may capture images of any length of road, including images of the road a few feet in front of the vehicle 100 to images of the road extending hundreds of feet or more in front and to the sides of the vehicle 100.

The GPS receiver 120 is a device capable of determining a location estimate of the vehicle 100. The GPS receiver 120 may be a factory-installed system or may be a third-party or aftermarket system installed in the vehicle 100. In one embodiment, the GPS receiver 120 is implemented via a mobile device, such as a mobile phone, capable of receiving a GPS signal and communicatively coupled to the vehicle 100. The location estimate determined by the GPS receiver 120 may include latitude and longitude coordinates describing the location of the vehicle 100. In an alternative embodiment, the location estimate determined by the GPS receiver 120 includes an alternative format, such as the distance and/or trajectory from a known location, or any other location-identifying format.

The map imagery module 130 retrieves map images of a particular location, such as street view images, aerial images, and satellite images. Street view images include images of locations typically captured from the perspective of a car being driven on a street, but also may include images captured from any vehicle on any road, or images captured from the perspective of an individual at ground level. Street view images may be 360° images of the surroundings of the locations at which the images are captured. For example, a street view image captured from an intersection may contain the intersecting roads; cars being driven on the roads; pedestrians walking along side the roads; buildings, monuments, houses, and other man-made entities visible from the intersection; and mountains, trees, rivers, and other geographical features visible from the intersection. In one embodiment, the map imagery module 130 uses street view images from Google Maps Street View or from Bing Maps Streetside.

In addition to retrieving street view images, the map imagery module 130 may retrieve aerial view images of particular locations. Aerial view images are overhead perspective images captured from an airborne vehicle, such as a helicopter or an airplane. In one embodiment, aerial images are captured from roughly a roughly 45° angle above a particular location. Aerial images allow a viewer to estimate the depth and height of objects in the images. For example, an aerial image of several buildings may allow a viewer to estimate which of the buildings are the tallest and which are the shortest, and may allow a viewer to estimate the general shape of each of the buildings and any geographic features around the buildings. In one embodiment, the map imagery module 130 retrieves aerial view images from Google Maps 45° or from Bing Birds Eye.

Satellite images retrieved by the map imagery module 130 include images of a particular location captured via satellite. In one embodiment, the map imagery module 130 uses satellite images from Google Maps or Bing Maps. Although satellite images typically do not allow a viewer to estimate depth or height, satellite images may illustrate paths, trails and other roads outside of the government maintained streets and highways typically illustrated on maps.

The map imagery module 130 may store map images locally, or may retrieve the map images over a wireless network such as Wi-Fi, Wi-Max, LTE, or commercial mobile phone networks. The map imagery module 130 may be factory-installed in the vehicle 100 or may be implemented with a mobile device, such as a mobile phone, communicatively coupled to the vehicle 100.

The odometry module 140 detects and determines changes in vehicle location over time. The odometry module 140 may organize this information into components such as velocity, acceleration, heading, displacement, changes in longitude and latitude coordinates, orientation, or any other suitable method of representing changes in location over time. The odometry module 140 may be implemented using accelerometers, visual odometers, movement detectors, or any other instruments capable of determining a change in location relative to a starting location.

The road departure module 150 determines whether the departure of a road being driven by the vehicle 100 is possible, and may determine the probability of or time until a road departure. The details of the road departure module 150 will be discussed in greater detail below with regards to FIG. 2. The warning module 160, responsive to a determination that a road departure is possible, warns the operator of the vehicle 100 of the potential road departure so that the vehicle operator can take action to avoid the potential departure. The warning may be a loud noise, such as a beep, or a visual indicator, such as a flashing display, to bring the potential road departure to the attention of the operator of the vehicle 100. The warning module 160 may automatically navigate the vehicle 100 to avoid the potential road departure. In one embodiment, the warning module 160 navigates the vehicle 100 to avoid a potential road departure only in response to a failure of the operator of the vehicle 100 to do so in response to a warning.

Figure 2:
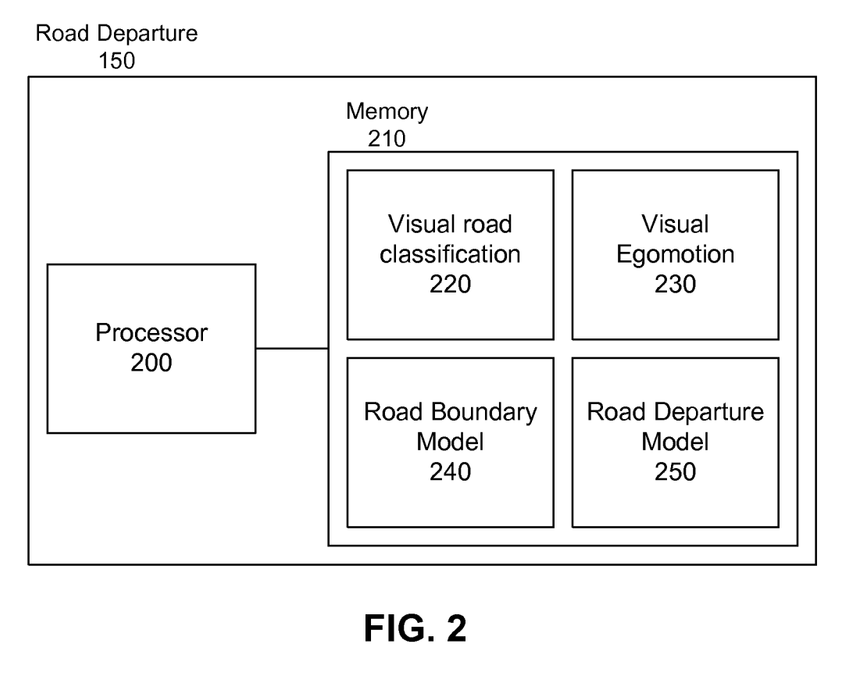
FIG. 2 illustrates a road departure module for determining a potential road departure in accordance with one embodiment.

FIG. 2 illustrates the road departure module 150 for determining a potential road departure in accordance with one embodiment. The road departure module 150 includes a computer processor 200 and a memory 210. Note that in other embodiments, the road departure module 150 may include additional features other than those illustrated in FIG. 2.

The processor 200 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 200 may include an arithmetic logic unit, a microprocessor, a general purpose computer, or some other information appliance equipped to transmit, receive and process electronic data signals from the memory 210, the camera 110, the GPS receiver 120, the map imagery module 130, the odometry module 140, or the warning module 160.

The memory 210 stores instructions and/or data that may be executed by processor 200. The instructions and/or data may comprise code (i.e., modules) for performing any and/or all of the techniques described herein. The memory 210 may be any non-transitory computer-readable storage medium such as dynamic random access memory (DRAM) device, a static random access memory (SRAM) device, Flash RAM (non-volatile storage), combinations of the above, or some other memory device known in the art.

The memory 210 includes a visual road classification module 220, a visual egomotion module 230, a road boundary model module 240 and a road departure model module 250. Note that in other embodiments, additional or fewer modules may be used to perform the functionality described herein. The modules stored are adapted to communicate with each other and the processor 200. The modules are also adapted to communicate with the camera 110, the GPS receiver 120, the map imagery module 130, and the odometry module 140 in order to make a determination of a potential road departure. Responsive to such a determination, the modules communicate with the warning module 160 to warn the operator of the vehicle 100 of the potential road departure.

Figure 3:
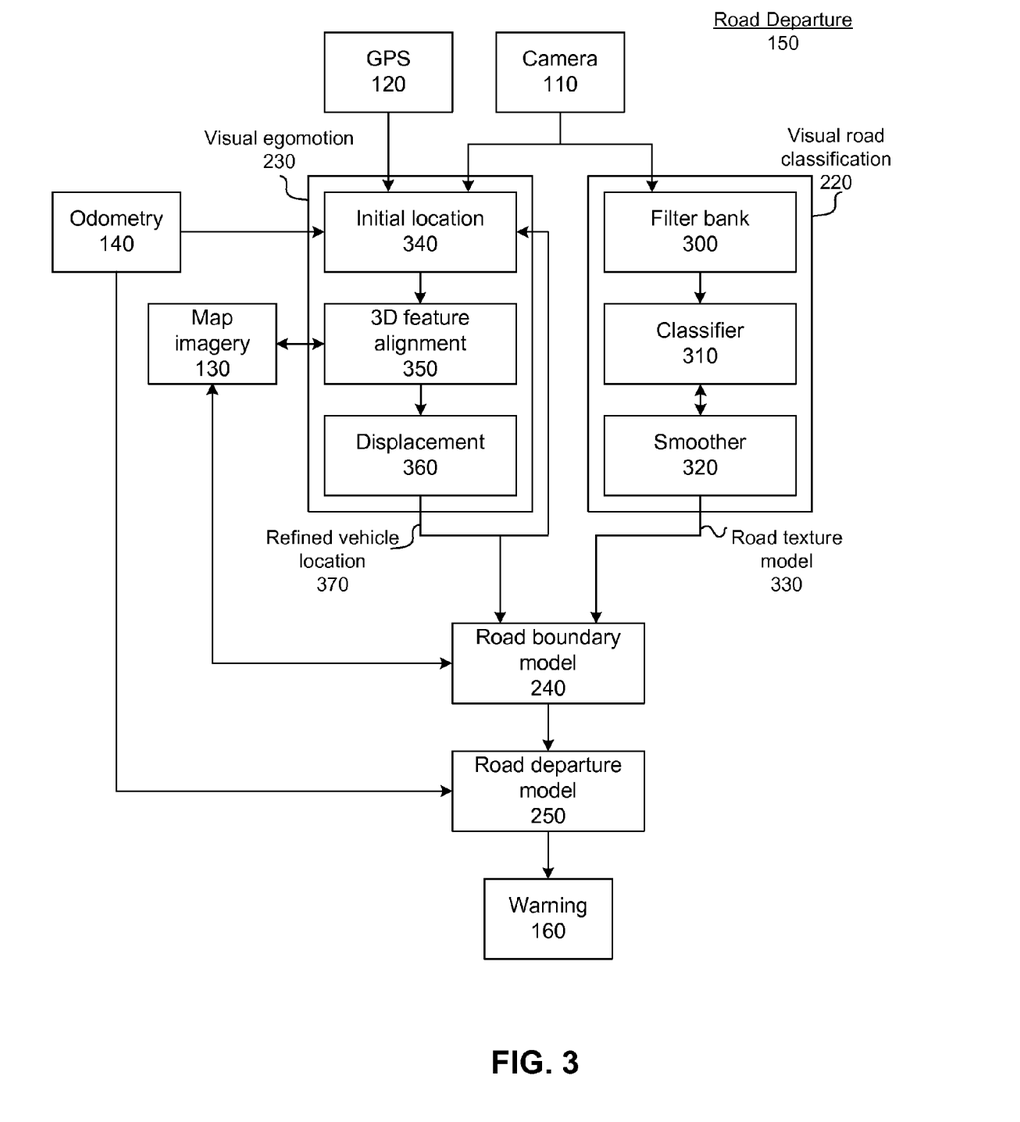
FIG. 3 is a block diagram illustrating the operation of the road departure warning system with vehicle components in accordance with one embodiment.

FIG. 3 is a block diagram illustrating the operation of the road departure warning system with vehicle components in accordance with one embodiment. In particular, FIG. 3 illustrates the interaction between the modules of the memory 210 and the components of the vehicle 100. Further description of each of the modules of the memory 210 will be given below. It should be noted that while the road departure system is described from the perspective of a single point in time (using, for example, a single road image from the camera 110, a single GPS location, etc.), the road departure system may operate iteratively (using, for example, successive images from the camera 110, successive GPS locations, etc.) to refine the road boundary model, the road departure model, and so forth.

Visual Road Classification

The visual road classification module 220 retrieves an image of the road on which the vehicle is driving, in the direction in which the vehicle is being driven, from the camera 110. The visual road classification module 220 then outputs a road texture model 330 based on the retrieved image. Texture information is computed for the retrieved image by convolving the retrieved image with a filter bank 300. "Texture" as used herein refers to the context in an image for a particular pixel, including the characteristics of the pixels surrounding the particular pixel. The filter bank 300 may include filters capable of detecting edges, points, curves, symmetry, color or contrast variance, or any other image characteristic related to texture. Examples of such filters include but are not limited to Gabor wavelets, blur filters, Gaussian filters, edge detectors (such as first-order Gaussian filters), curve detectors (such as second-order Gaussian filters), and Laplacian filters. In one embodiment, the filter bank 300 includes a set of directional edge filters along different orientations.

The filter bank 300 may contain any number of filters. In one embodiment, the filter bank 300 contains 20 or more filters. For each image pixel processed by the filter bank 300, the filter bank 300 produces a texture vector describing the texture of the image pixel. In one embodiment, for a filter bank 300 containing N filters, the filter bank 300 outputs an N-entry texture vector. In this embodiment, each of the N filters' output values are concatenated together to produce the N-entry texture vector. For an image containing M pixels, the filter bank 300 may produce M texture vectors, with each of the M texture vectors associated with a distinct image pixel. Texture vectors are referred to herein as "textons", and the process of computing textons for an image is referred to herein as "textonizing" the image.

Once an image is textonized, the classifier module 310 classifies each texton as "road" or "non-road" depending on whether the texton is associated with a pixel determined to represent the road on which the vehicle 100 is being driven or determined to not represent the road, respectively. The classifier module 310 contains a series of classifiers trained to classify textons by constructing a discretized representation of the road/non-road texture space through vector quantization during a training phase.

During the classifier training phase, a set of training images is retrieved, and the pixels in the set of training images are pre-classified as road or non-road. The training images are processed by the filter bank 300 to produce textons for the training image pixels. The classifiers are then trained to classify the training image textons as road or non-road based on whether the pixels associated with the textons are pre-classified as road or non-road.

In one embodiment, the classifiers of the classifier module 310 are random forest classifiers. Beneficially, random forest classifiers are simple classifiers with fast operation during run-time. Further, random forest classifiers are adaptable during runtime to improve the performance of the classifiers. Random forest classifiers include a series of classifier "trees" (for instance, 25 trees, though any number may be used), each with a root node, two or more leaf nodes, and any number of intermediate nodes and node layers. Each classifier tree node has two sub-nodes, with the exception of leaf nodes, which have no sub-nodes. Each classifier tree node is randomly assigned to a texton entry (an entry of a texture vector) and is randomly assigned a threshold value. More information about random forest classifiers can be found in L. Breiman's "Random Forests" in Machine Learning, Vol. 45, No. 1, pages 5-32, and in P. Geurts' "Extremely Randomized Trees" in Machine Learning, Vol. 63, No. 1, pages 3-42, which are incorporated by reference herein.

A texton in a training image is processed by a classifier tree by starting at the tree's root node, retrieving the texton entry value for the texton entry assigned to the tree's root node, and progressing to a first sub-node of the root node if the texton entry value is less than the assigned threshold value or progressing to a second sub-node of the root node if the texton entry value is greater than the assigned threshold value. This process repeats for each sub-node until a leaf node is reached. Each leaf node maintains a set of probabilities for the textons which are processed by the classifier tree and which reach the leaf node. The maintained set of probabilities represents the classification distribution of training image textons which are associated with pixels pre-classified as road or non-road. For example, a particular leaf node may have a maintained set of probabilities indicating that of the processed training textons that reach the leaf node, 60% are associated with pixels pre-classified as road and 40% are associated with pixels pre-classified as non-road. During training, the maintained sets of probabilities are updated to reflect the classification distribution of the pre-classified pixels associated with the processed textons. Each texton in each training image is processed by each random forest classifier tree, producing a probability distribution or histogram for each leaf node in each classifier tree.

During runtime, the classifier module 310 processes the image textons received from the filter bank 300 using the trained set of random forest classifiers described above. Similar to the process of training the classifier trees, each texton is processed by each classifier tree by retrieving the texton entry value of the texton for the texton entry assigned to the tree's root node and progressing to a first or second sub-node of the root node based on whether or not the retrieved texton entry value exceeds the threshold value assigned to the root node. This process is repeated down the classifier tree until a leaf node is reached, at which point the road/non-road probability distribution of the leaf node is retrieved. For each texton, the leaf node probability distributions retrieved from all of the classifier trees (one for each classifier tree) are averaged into a final probability distribution for the texton. If the final probability distribution is greater than 50% road, the texton is classified as a road texton. Likewise, if the final probability distribution is greater than 50% non-road, the texton is classified as a non-road texton. In this way, each image texton received from the filter bank 300 is classified as road or non-road.

Optionally, the visual road classification module 220 includes a smoother module 320. The smoother module 320 receives the texton classifications from the classifier module 310 and applies a smoothing function to the texton classifications to reduce texton classification noise, outliers, and anomalies. For example, if a particular texton is classified as non-road, but all textons within a threshold number of pixels of the particular texton are classified as road, the smoother module 320 may re-classify the particular texton as road. Any suitable smoothing function may be utilized by the smoother module 320, such as a Butterworth filter, Laplacian smoothing, or local regression. In one embodiment, the smoother module 320 includes a Markov Random Field smoother for smoothing.

The use of random forest classifiers in the classifier module 310 allows the probability distribution maintained by the leaf nodes of the random forest classifier trees to be updated during run-time. For textons of an image captured by the camera 110 associated with pixels that are known to represent road or non-road, the probability distributions of the classifier tree leaf nodes can be updated based on the known pixel classifications. For example, for each classification tree leaf node arrived at while processing a texton associated with a known "road" pixel, the probability distributions of the leaf node can be incrementally updated to favor the "road" classification. In one embodiment, pixels representing road within one meter directly in front of the vehicle 100 are considered road for the purposes of updating classifier tree leaf node probability distributions in run-time. Likewise, pixels representing road previously driven directly over (for instance, during previous road texture model creation) may be considered road for the purposes of updating classifier tree leaf node probability distributions in run-time. In one embodiment, textons smoothed by the smoother module 320 are used to update the classifier tree leaf node probability distributions. In this embodiment, if the pixels surrounding a particular pixel exceed a classification threshold, the particular pixel may be considered road or non-road (based on the classification threshold) for the purposes of updating classifier tree leaf node probability distributions.

Other classifiers may be used by the classifier module 310 in place of random forest classifiers. In one embodiment, the classifier module 310 uses support vector machines (SVMs). SVMs may be updated in runtime, but at greater computational and resource costs for both classification and updating. Beneficially, SVMs provide theoretical guarantees of accuracy. Alternatively, the classifier module 310 may utilize nearest neighbor classifiers. While nearest neighbor classifiers require similar computational and resource requirements for classification, updating nearest neighbor classifiers in run time is significantly more complex than runtime updating in random forest classifiers. While either nearest neighbor classifiers or SVMs may be used by the classification module 310, the increased computational and resource requirements may decrease the effectiveness of the visual road classification module 220.

In one embodiment, the classifier module 310 maintains different classifier modules for each type of road surface. For example, the classifier module 310 may maintain a distinct model for paved road, for dirt road, for sidewalk, etc. Alternatively, the classifier module 310 may incorporate all types of road surfaces into a single classifier model.

The visual road classification module 220 produces a road texture model 330 based on the classified textons of a retrieved image. The road texture model 330 includes the retrieved image with each individual pixel of the image classified as road or non-road based on the output of the classifier module 310 or the smoother module 320. In one embodiment, the road texture model 330 includes an association between each classified pixel and a location on the road in front of or near the vehicle 100.

Visual Egomotion

The visual egomotion module 230 determines an initial vehicle location estimate and produces a refined vehicle location 370 based on this initial location. The refined vehicle location 370 may be accurate to within a meter. In one embodiment, an initial location module 340 retrieves an initial location estimate from the GPS receiver 120. Alternatively, the initial location estimate may be based on a previously computed refined vehicle location 370 and odometry information received from odometry module 140. For example, the initial location module 340 may determine a delta distance and direction traveled by the vehicle 100 since the previous refined vehicle location 370 was computed from the odometry information received from the odometry module 140, and the initial location module 340 may determine an initial location estimate by adding the determined delta to the previous refined vehicle location 370.

The initial location module 340 retrieves an image of the surroundings of the road on which the vehicle 100 is driving from the camera 110, and outputs the retrieved vehicle image and the initial location estimate to the 3D feature alignment module 350. The 3D feature alignment module 350 requests and retrieves map images (such as street view images, aerial view images, or satellite images) from the map imagery module 130 based on the initial location estimate. Each retrieved map image includes location information describing the location associated with the map image. In one embodiment, this location information includes latitude and longitude coordinates, though location information of any format may be used. Any number of map images may be retrieved from the map imagery module 130. In one embodiment, the 3D feature alignment module 350 retrieves all available map images associated with locations within a pre-determined radius of the initial location estimate.

The 3D feature alignment module 350 performs visual odometry between the retrieved map images and the retrieved vehicle image. The 3D feature alignment module 350 detects 3D features in the retrieved vehicle image and in the retrieved map images. 3D features include buildings, trees, roads and road features (such as turns and the shape of the road), mountains, or any other object or entity which may be visible in an image. It should be noted that although they are referred to herein as "3D features", detected 3D features may be essentially 2D in nature (for example, roads). 3D features are detected using edge detectors, point detectors, depth estimation techniques or any other suitable form of image processing which can detect 3D features in an image. In one embodiment, the retrieved map images include pre-detected 3D feature information; in this embodiment, the 3D feature alignment module 350 only detects 3D features in the retrieved vehicle image. In the event that the retrieved map images are satellite images, detecting 3D features may be limited to detecting the edges of roads, buildings and other satellite image features.

The 3D feature alignment module 350 aligns the 3D features of the retrieved vehicle image with the 3D features of the retrieved map images. 3D features are aligned by comparing the location, type and/or depth of each 3D feature in the retrieved vehicle image with the location, type and/or depth of each 3D feature in the retrieved map images. In the event that none of the retrieved map images are taken from an exact or a very similar perspective as the retrieved vehicle image, the 3D feature alignment module 350 may consider secondary factors when comparing 3D features between images, including the distance, displacement, and angle between 3D features in an image. The 3D feature alignment module 350 selects a retrieved map image based on this comparison. In one embodiment, the retrieved map image with the most 3D features in common with the retrieved vehicle image is selected. The location associated with the selected map described by the map's location information is referred to herein as the "ground truth" location.

In one embodiment, the 3D feature alignment module 350 estimates the 3D location (for instance, the latitude and longitude) of each 3D feature of the retrieved images, and projects the estimated locations onto the ground plane (for instance, a 2D map of the area). In this embodiment, the 3D feature alignment module 350 compares the 3D features between the retrieved map images and the retrieved vehicle images by comparing the locations of the features projected onto the ground plane. Beneficially, this allows the 3D feature alignment module 350 to compare the retrieved vehicle image with retrieved satellite map images, which already contain 3D features projected onto a 2D plane.

In one embodiment, the 3D feature alignment module 350 uses odometry information from the odometry module 140 when comparing 3D features between retrieved images. In this embodiment, the odometry information may include information about recent directions driven and turns taken by the vehicle 100. The 3D feature alignment module 350 may compare this odometry information with roads, road curves, turns, and other road features identified in the retrieved map images.

Once a retrieved map image is selected, the 3D feature alignment module 350 outputs the selected map image and the retrieved vehicle image to the displacement module 360. The displacement module 360 determines the displacement (for instance, the distance and angle, or the delta in latitude/longitude coordinates) between the location at which the retrieved vehicle image was captured and the location represented by the selected map image's location information.

In one embodiment, the displacement module 360 determines the displacement between locations based on the 3D features of the selected map image and the retrieved vehicle image. First, the 3D features of each image are projected and aligned onto the ground plane. The ground plane location associated with the selected map image is determined relative to the selected map image's projected 3D features. Similarly, the ground plane location associated with the retrieved vehicle image is determined relative to the retrieved vehicle image's projected 3D features. Finally, the displacement between the ground plane locations associated with the selected map image and the retrieved vehicle image is determined.

Once the displacement between the selected map image and the retrieved vehicle image is determined, the displacement module 360 determines the location of the vehicle 100, the refined vehicle location 370. The refined vehicle location 370 is determined by adding the determined displacement to the location represented by the selected map image's location information. For example, if the selected map image's location information indicates that the selected map image is associated with the latitude and longitude (X, Y), and if the determined displacement is a latitude and longitude delta (+A, −B), the displacement module 360 outputs the latitude and longitude coordinates (X+A, Y−B) as the refined vehicle location 370. As discussed above, the refined vehicle location 370 may have sub-meter accuracy.

Road Boundary Model/Road Departure Model

The road boundary model module 240 receives the road texture module 330 and the refined vehicle location 370 and creates a road boundary model. The road boundary model includes information describing the shape of the road on which the vehicle 100 is located, for example, the location of the edges of the road; the shape and width of the road; functions curve-fit to the center line of the road or to the edges of the road; the location, shape and pitch of turns in the road; the location of intersections; the location of non-road geographic features near the road; and any other characteristic of the road.

The road boundary model 240 outputs the road boundary model as well as the refined vehicle location 370 to the road departure model module 250.

The road boundary model module 240 identifies the edges of the road on which the vehicle 100 is being driven. In one embodiment, the road boundary model module 240 uses satellite imagery to identify road edges. The road boundary model module 240 may query the map imagery module 130 using the refined vehicle location 370 to retrieve satellite images of the road. In the event that the road edges are marked in the satellite images (for instance, with solid lane lines), the road boundary model module 240 may use the lane lines (plus an optional extra margin) as the identified road edges. In the event that the road edges are not marked in the satellite images, the road boundary model module 240 may process the satellite images using classifiers which identify the edges of the road. For example, the classifiers may classify pixels in the satellite images as road or non-road.

In one embodiment, in addition to or instead of using satellite images to identify road edges, the road boundary model module 240 uses aerial view map images or street view map images from the map imagery module 130. Alternatively, the road boundary model module 240 may use the road texture model 330 or an image from the camera 110 to identify road edges. In these embodiments, either lane lines or classifiers may be used to identify road edges.

The road boundary model module 240 optionally identifies the center and the width of the road based on the identified edges. The center line of the road is identified by locating the midpoint line between the identified road edges. For example, the location of each point of the center line of the road is determined by averaging the distance and location between corresponding points in the identified road edges. The width of the road is identified by determining the distance between the identified road edges. "Center line" and "width" as used herein do not necessarily refer to lines and constant widths, but instead may define variable, non-linear functions that dynamically define the center line and the width of the road for any length of the road. In one embodiment, the road boundary model module 240 optionally reduces the identified width of the road by a pre-determined safety margin. This embodiment beneficially allows the road boundary model module 240 to increase the safety of the road departure warning system.

The road boundary model module 240 fits a curve to the identified road edges, the identified center line of the road, the identified road width or shape, images retrieved from the map imagery module 130, and/or images from the camera 110 to create a road boundary model. Any type of curve fitting may be utilized that produces one or more functions which describe the size, shape and features of the road. For example, the road boundary model module 240 may utilize polynomial interpolation, sinusoidal or conic section interpolation, algebraic curve fitting, geometric curve fitting, or non-linear regression. In one embodiment, the road boundary model module 240 uses dynamic programming to fit a curve to a road. In this embodiment, the road boundary model module 240 creates a model describing the road which maximizes the number of pixels in the images retrieved from the map imagery module 130 or the camera 110 that represent road while minimizing the number of pixels that do not represent road. External constraints such as the maximum curvature of the road can also be applied.

The road departure model module 250 receives a road boundary model and a refined vehicle location 370 from the road boundary model module 240 and odometry information from the odometry module 140, and creates a road departure model based on this information. The road departure model may include a probability distribution for the likelihood of a road departure by the vehicle 100. In one embodiment, the probability distribution is based on the distance from the front-center of the vehicle 100 to the center line of the road perpendicular to the steerage line (the current steering direction from the front-center of the vehicle 110). In this embodiment, the perpendicular distance is transformed into a probability whose cumulative distribution is 0 when the distance is 0 and is unity when the distance is equal to the width of the road. The perpendicular distance may be determined from the odometry information received from the odometry module 140, or from images retrieved from the camera 110 (assuming the camera 110 is aligned so that the steerage line of the vehicle 110 can be projected onto the camera image). If the cumulative probability distribution for a road departure exceeds a departure threshold, the road departure model module 250 may request a driver warning from the warning module 160.

In one embodiment, the road departure model is based upon the location of the vehicle 110 on the road (for example, the refined vehicle location 370), the distance between the front-center of the vehicle 110 and a road edge along the steerage line, and the speed of the vehicle. In this embodiment, the road departure model module 250 computes a time to departure for the current trajectory of the vehicle. If the time to departure is less than a departure threshold, the road departure model module 250 may request a driver warning from the warning module 160.

The departure thresholds of the road departure model module 250 may be pre-determined. In addition, the departure thresholds may vary according to road conditions (such as weather or detected cars or objects in the road), the speed or direction of the vehicle 110, the accuracy of the refined vehicle location 370, or the road width safety margin reductions of the road boundary model. The departure thresholds may be learned from supervised training examples, or may be set manually. In one embodiment, multiple thresholds may be pre-determined, such as a possible departure threshold (representing a possible road departure), a likely departure threshold (representing a more than 50% chance of a road departure), and an imminent departure threshold (representing, for example, a 90% or greater chance of a road departure). In this embodiment, the warning provided by the warning module 160 may vary based on which departure threshold was exceeded.

Road Departure Warning System Operation

Figure 4:
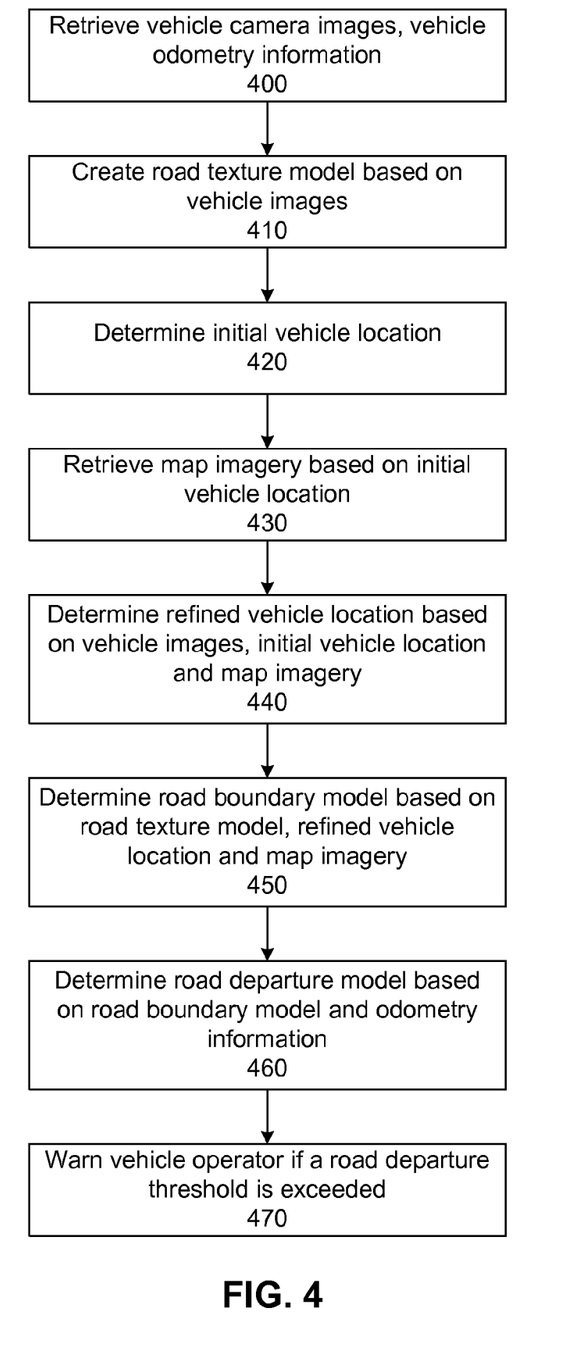
FIG. 4 is a flowchart of the operation of the road departure warning system providing a warning for a potential road departure in accordance with one embodiment.

FIG. 4 is a flowchart of the operation of the road departure warning system providing a warning for a potential road departure in accordance with one embodiment. One or more images from a vehicle camera and vehicle odometry information is received 400. The road departure warning system creates 410 a road texture model based on the vehicle images. As discussed above, the road texture model includes a model that classifies vehicle image pixels as "road" or "non-road".

The road departure warning system determines 420 an initial vehicle location. The initial vehicle location may be retrieved from an in-vehicle GPS receiver, or may be retrieved based on a previous location determination modified with odometry information to reflect vehicle movement since the determination of the previous vehicle location. Map imagery is retrieved 430 based on the determined initial vehicle location. The retrieved map imagery may include satellite imagery, aerial map imagery or street view imagery. A refined vehicle location is determined 440 based on the vehicle images, the initial vehicle location, and the retrieved map imagery. The refined vehicle location may be determined using visual egomotion.

A road boundary model is determined 450 based on the road texture model, the refined vehicle location and the retrieved map imagery. A road departure model is determined 460 based on the road departure model and the retrieved odometry information. The road departure model may identify the probability of a road departure based on the current location of the vehicle on the road, the speed of the vehicle, and the steerage direction of the vehicle. Likewise, the road departure model may identify the time until a road departure based on these factors. The road departure model may additionally be determined based on the refined vehicle location. If it is determined that a departure threshold is exceeded, the operator of the vehicle is warned 470 using a vehicle warning system.

Figure 5:
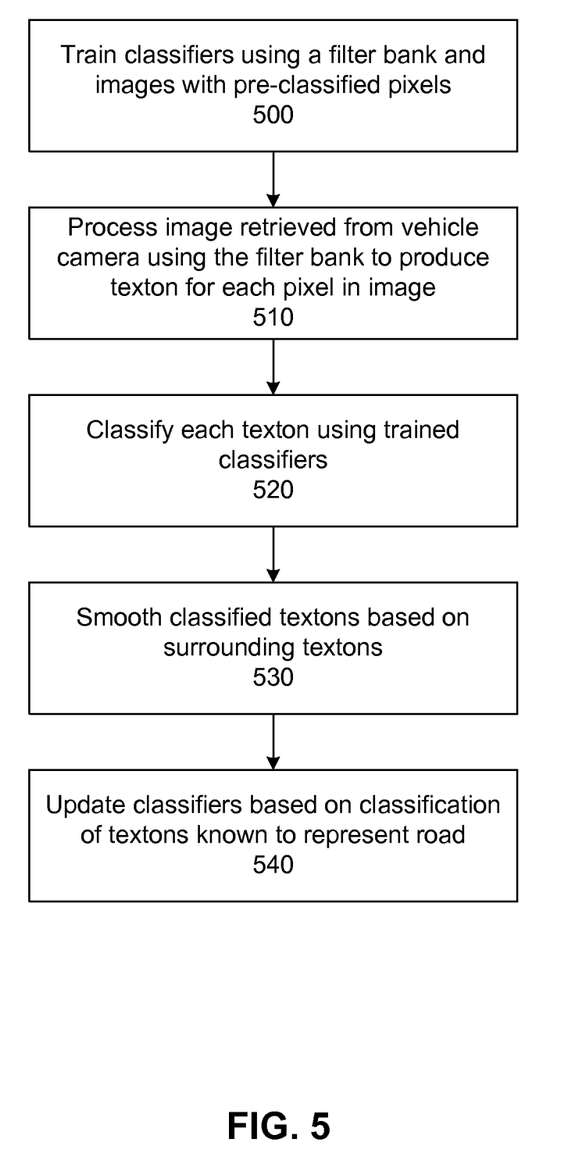
FIG. 5 is a flowchart illustrating the creation of a road texture model in accordance with one embodiment.

FIG. 5 is a flowchart illustrating the creation of a road texture model in accordance with one embodiment. A set of classifiers are trained 500 using a filter bank and a set of training images with pre-classified pixels. The pixels of the training images are pre-classified as "road" and "non-road", as discussed above. An image retrieved from a vehicle camera is processed 510 using the filter bank used to train the set of classifiers, producing a texton for each pixel in the image. Each produced texton is classified 520 as road or non-road using the set of trained classifiers. The classified textons are smoothed 530 based on the surrounding textons. For example, if a texton is classified as road, but it is surrounded by a threshold number of textons classified as non-road, the classification of the texton classified as road may be changed to non-road. Optionally, the classifiers may be updated 540 during runtime based on the classification of textons known to represent road.

Figure 6:
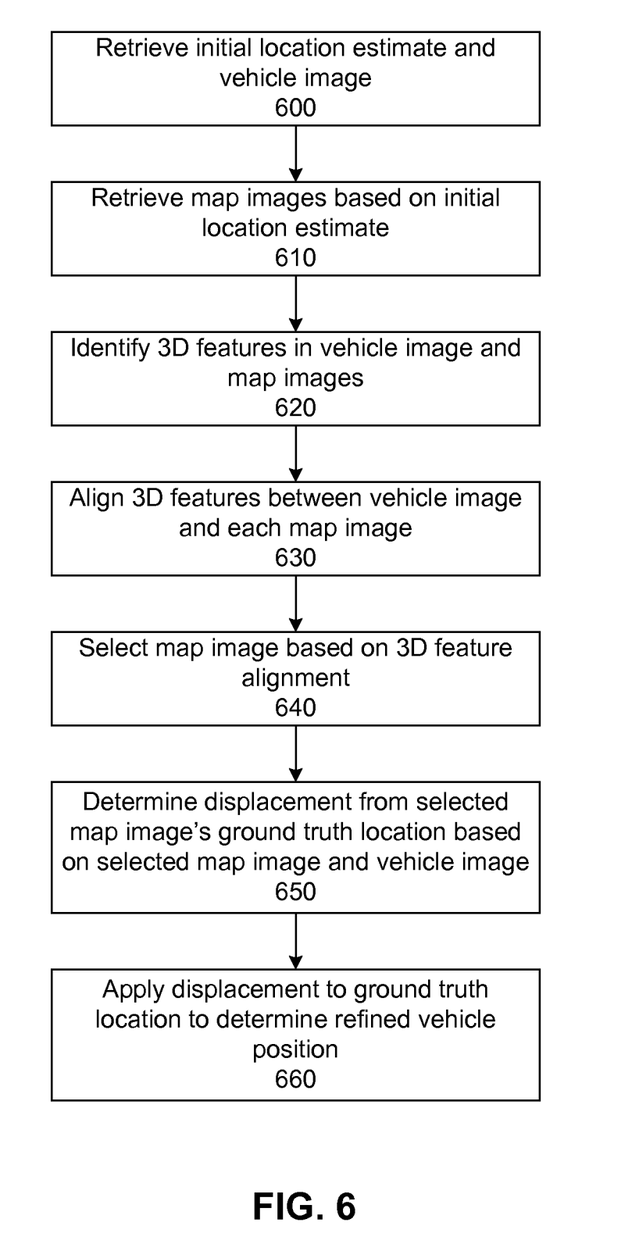
FIG. 6 is a flowchart illustrating the determination of a refined vehicle location in accordance with one embodiment.

FIG. 6 is a flowchart illustrating the determination of a refined vehicle location in accordance with one embodiment. An initial vehicle location estimate and an image from the vehicle camera are retrieved 600. Map images are retrieved 610 based on the initial location estimate. Each map image includes location information describing a location associated with the map image. 3D features are identified 620 in the retrieved vehicle image and in the retrieved map images. The 3D features are aligned 630 between the vehicle image and each retrieved map image. A map image is selected 640 based on the alignment between the 3D features in the vehicle image and each map image. For example, the map image with the most common 3D features with the vehicle image is selected. The displacement is determined 650 from the selected map image's ground truth location based on the selected map image and the vehicle image. The displacement is applied 660 to the ground truth location to determine a refined vehicle location for the vehicle. In one embodiment, the refined vehicle location is determined with sub-meter accuracy.

Figure 7:
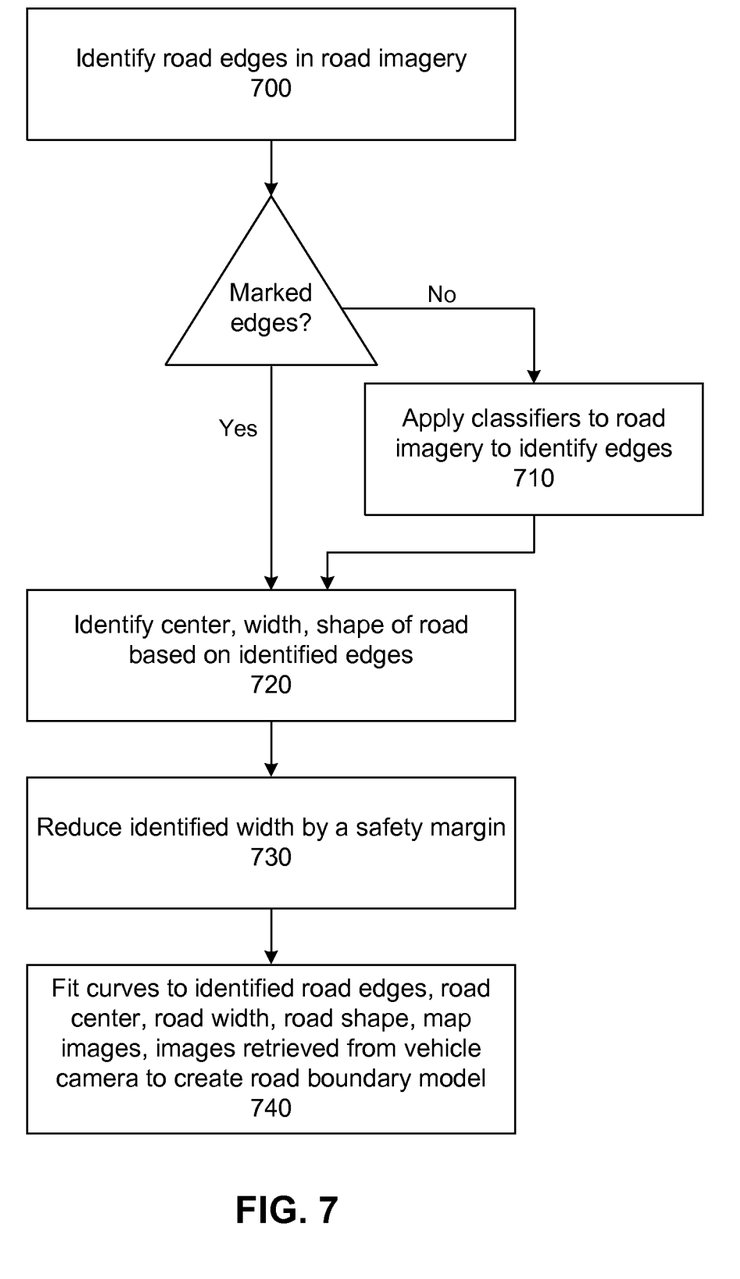
FIG. 7 is a flowchart illustrating the creation of a road boundary model in accordance with one embodiment.

FIG. 7 is a flowchart illustrating the creation of a road boundary model in accordance with one embodiment. Road edges are identified 700 in road imagery. For example, road edges may be identified in satellite imagery, aerial map imagery, street view imagery or in images from a vehicle camera. If the road edges aren't marked in the road imagery, classifiers are applied 710 to identify the road edges. The center, width and/or shape of the road are optionally identified 720 based on the identified road edges. In one embodiment, the width of the road is reduced 730 by a safety margin. Curves are fit 740 in the road edges, the road center, the road width, the road shape, the map images, and/or images retrieved from the vehicle camera to create a road boundary model.

Additional Considerations

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions could be embodied in software, firmware or hardware, and when embodied in software, could be downloaded to reside on and be operated from different platforms used by a variety of operating systems. The embodiment can also be in a computer program product which can be executed on a computing system.

The exemplary embodiments also relate to an apparatus for performing the operations herein. This apparatus may be specially constructed for the purposes, e.g., a specific computer in a vehicle, or it may comprise a general-purpose computer selectively activated or reconfigured by a computer program stored in the computer which can be in a vehicle. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the exemplary embodiments are not described with reference to any particular programming language. It will be appreciated that a variety of programming languages may be used to implement the teachings as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure is intended to be illustrative, but not limiting, of the scope of the embodiments.

While particular embodiments and applications have been illustrated and described herein, it is to be understood that the embodiment is not limited to the precise construction and components disclosed herein and that various modifications, changes, and variations may be made in the arrangement, operation, and details of the methods and apparatuses without departing from the spirit and scope.

What is claimed is:

1. A method of providing a road departure warning alert in a vehicle comprising:
    creating a road texture model based on a vehicle image received from a vehicle camera, the road texture model classifying each of a plurality of portions of the vehicle image as road or non-road;
    smoothing the road texture model by:
        identifying outlier portions of the vehicle image, wherein each outlier portion comprises an image portion classified as non-road and surrounded by a threshold number of portions of the vehicle image classified as road; and
        re-classifying the identified outlier portions as road;
    retrieving map imagery based on an initial vehicle location estimate;
    determining a refined vehicle location using visual egomotion based on the vehicle image and the map imagery by:
        aligning 3D features between the vehicle image and each map image in the retrieved map imagery;
        selecting a map image based on the aligned 3D features;
        determining a displacement between a location associated with the selected map image and a corresponding location associated with the vehicle image; and
        applying the determined displacement to the initial vehicle location estimate to determine the refined vehicle location;
    creating a road boundary model describing the edges of the road on which the vehicle is located based on the smoothed road texture model and the refined vehicle location;
    creating a road departure model based on the road boundary model and vehicle odometry information; and
    warning a vehicle operator based on the road departure model.

2. The method of claim 1, wherein the vehicle image comprises an image of the road on which the vehicle is located in the direction in which the vehicle is moving.

3. The method of claim 1, wherein creating a road texture model further comprises:
    processing the vehicle image using a filter bank to produce a texton for each pixel in the vehicle image; and
    classifying each texton in vehicle image using a set of classifiers.

4. The method of claim 3, further comprising:
    training the set of classifiers using the filter bank and a set of training images with pre-classified pixels.

5. The method of claim 3, wherein the set of classifiers comprise random forest classifiers.

6. The method of claim 3, further comprising:
    updating the set of classifiers based on the classification of textons representing pixels with known classifications.

7. The method of claim 1, wherein the retrieved map imagery comprises one of: satellite map imagery, aerial map imagery, and street view map imagery.

8. The method of claim 1, wherein the initial vehicle location estimate comprises location coordinates received from a GPS receiver.

9. The method of claim 1, wherein the 3D features are identified using edge detectors to detect edges in images.

10. The method of claim 1, wherein aligning the 3D features between the vehicle image and each map image comprises:
    projecting the 3D features onto the ground plane; and
    comparing the ground plane location of the vehicle image's 3D features to the ground plane location of each map image's 3D features.

11. The method of claim 1, wherein the selected map image comprises the map image with the most 3D features in common with the vehicle image.

12. The method of claim 1, wherein creating a road boundary model comprises:
    identifying the edges of the road based on an image of the road;
    identifying the width of the road based on the identified road edges;
    reducing the identified width of the road by a safety margin; and
    fitting one or more curves to the road edges and reduced width of the road to create a road boundary model.

13. The method of claim 12, wherein the image of the road comprises one or more of the vehicle image, a satellite map image of the road, an aerial map image of the road, and a street view map image of the road.

14. The method of claim 12, further comprising:
    identifying one or both of the center line of the road and the shape of the road; and
    fitting one or more curves to the center line of the road or the shape of the road.

15. The method of claim 1, wherein creating a road departure model comprises identifying the probability of a road departure based on the road boundary model and the vehicle odometry information.

16. The method of claim 15, wherein warning a vehicle operator based on the road departure model comprises warning the vehicle operator when the identified probability of a road departure exceeds a pre-determined threshold.

17. A system of providing a road departure warning alert in a vehicle comprising:
    a non-transitory computer-readable storage medium storing computer executable instructions comprising:
        a road texture module configured to create a road texture model based on a vehicle image received from a vehicle camera, the road texture model classifying each of a plurality of portions of the vehicle image as road or non-road;
a smoothing module configured to smooth the road texture module by:
  identifying outlier portions of the vehicle image, wherein each outlier portion comprises an image portion classified as non-road and surrounded by a threshold number of portions of the vehicle image classified as road; and
  re-classifying the identified outlier portions as road;
a map module configured to retrieve map imagery based on an initial vehicle location estimate;
a location module configured to determine a refined vehicle location using visual egomotion based on the vehicle image and the map imagery by:
  aligning 3D features between the vehicle image and each map image in the retrieved map imagery;
  selecting a map image based on the aligned 3D features;
  determining a displacement between a location associated with the selected map image and a corresponding location associated with the vehicle image; and
  applying the determined displacement to the initial vehicle location estimate to determine the refined vehicle location;
a road boundary module configured to create a road boundary model describing the edges of the road on which the vehicle is located based on the smoothed road texture model and the refined vehicle location;
a road departure module configured to create a road departure model based on the road boundary model and vehicle odometry information; and
a warning module configured to warn a vehicle operator based on the road departure model; and
a processor configured to execute the computer executable instructions.

18. A method of refining a vehicle location estimate comprising:
  creating a road texture model based on a vehicle image received from a vehicle camera, the road texture model classifying each of a plurality of portions of the vehicle image as road or non-road;
  smoothing the road texture model by:
    identifying outlier portions of the vehicle image, wherein each outlier portion comprises an image portion classified as non-road and surrounded by a threshold number of portions of the vehicle image classified as road; and
    re-classifying the identified outlier portions as road;
  retrieving map imagery based on an initial vehicle location estimate; and
  determining a refined vehicle location using visual egomotion based on the vehicle image, the smoothed road texture model, and the map imagery at least in part by:
    aligning 3D features between the vehicle image and each map image in the retrieved map imagery;
    selecting a map image based on the aligned 3D features;
    determining a displacement between a location associated with the selected map image and a corresponding location associated with the vehicle image; and
    applying the determined displacement to the initial vehicle location estimate to determine the refined vehicle location.

19. The method of claim 18, wherein the vehicle comprises a GPS receiver, and wherein the initial vehicle location estimate comprises a GPS location estimate received from the GPS receiver.

* * * * *